Figures 1, 2:
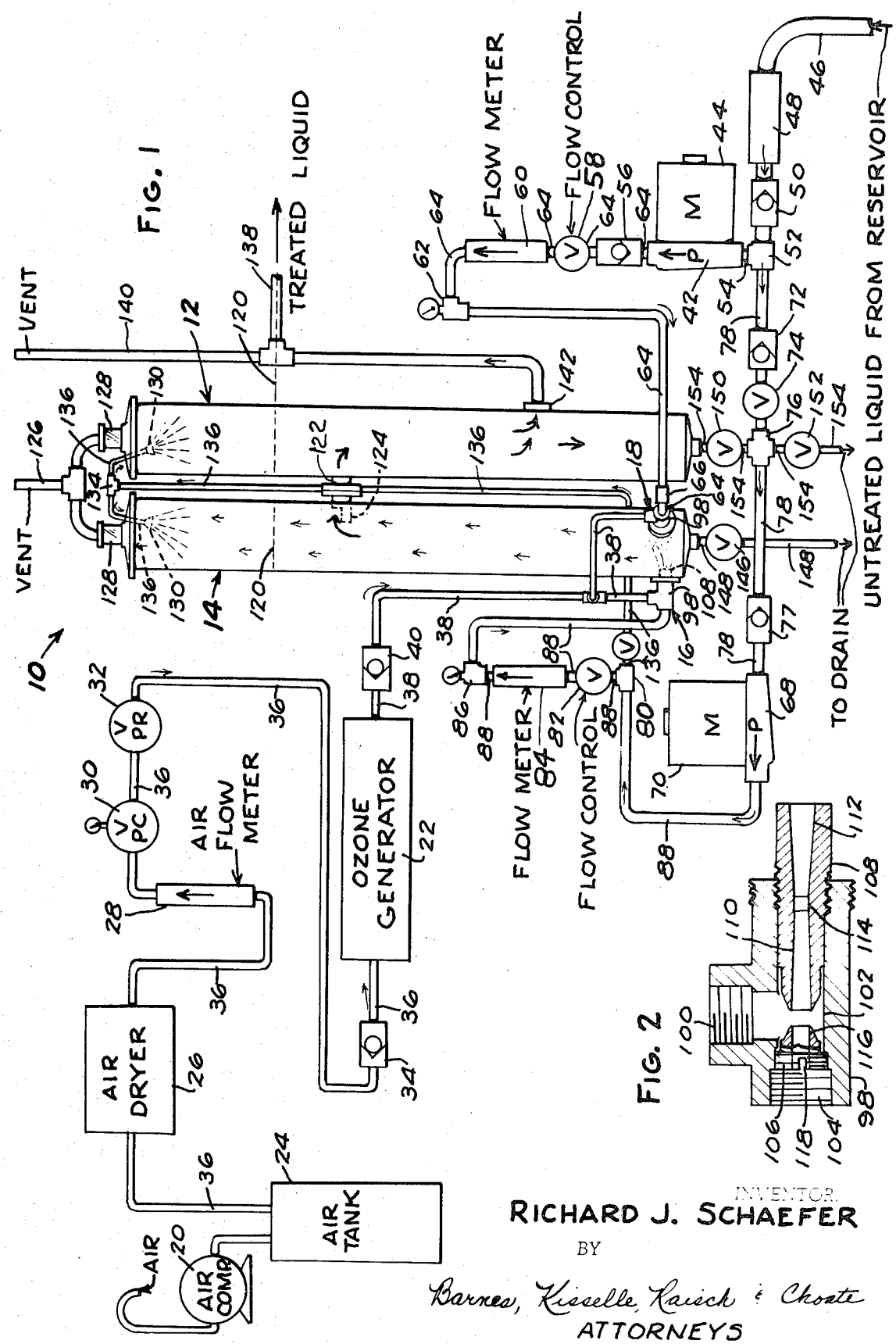

United States Patent
Schaefer

[15] 3,685,656
[45] Aug. 22, 1972

[54] RECIRCULATING OZONE TREATMENT APPARATUS

[72] Inventor: Richard J. Schaefer, 16852 Murray Hill Ave., Detroit, Mich. 48235

[22] Filed: March 11, 1971

[21] Appl. No.: 123,145

[52] U.S. Cl. ............................................. 210/195
[51] Int. Cl. ............................................. C02b 3/09
[58] Field of Search .......... 210/192, 63, 64, 169, 167, 210/220, 221, 194; 261/DIG. 42, 36 R, 121; 137/571, 576; 204/313

[56] References Cited

UNITED STATES PATENTS

| | | | |
|---|---|---|---|
| 2,050,771 | 8/1936 | Wolf | 210/192 |
| 3,382,980 | 5/1968 | Silva | 210/192 X |
| 3,448,045 | 6/1969 | Hen et al. | 210/63 |

*Primary Examiner*—Reuben Friedman
*Assistant Examiner*—T. A. Granger
*Attorney*—Barnes, Kisselle, Raisch & Choate

[57] ABSTRACT

An apparatus for the recirculating treatment of contaminated liquids with ozone having ventures which mix ozone with contaminated liquid and discharge the mixture into a treatment tank. A holding tank is connected to and receives liquid from the treatment tank and a portion of this liquid is recirculated through the ventures and treatment tank. The extent to which the contaminated liquid is exposed to and treated by ozone is controlled by varying the rate at which the liquid is recirculated in relation to the rate at which treated liquid is discharged from the holding tank.

14 Claims, 2 Drawing Figures

INVENTOR
RICHARD J. SCHAEFER
BY
Barnes, Kisselle, Raisch & Choate
ATTORNEYS

RECIRCULATING OZONE TREATMENT APPARATUS

This invention relates to the treatment of contaminated liquids with ozone and more particularly to an apparatus for recirculating and treating liquids with ozone.

Ozone is an allotropic form of oxygen which will reduce poisonous solutions containing cyanide, cyanite and phenol contaminants to nonpoisonous solutions which can be discharged into natural water sources without adverse ecological and environmental effects. The reduction of these poisonous chemicals with ozone proceeds more rapidly if the Ph value of the solution is controlled so that the solution is approximately neutral. Ozone also oxidizes and destroys bacteria and most other organic contaminants in solutions such as water soluble cutting and cooling oils which are used extensively in connection with most machining operations in large industrial plants. In large industrial plants, these cutting and cooling oils are usually recirculated and used many times in a closed system with a large central storage reservoir and eventually become highly contaminated with bacteria and organic matter which produces offensive odors and becomes a health hazard. Chemical additives have been developed to retard the growth of bacteria in these cutting oils. However, the bacteria develop an immunity to these additives which requires increasing the concentration of the additives to control the bacteria, sufficient concentrations become toxic to people exposed to the cutting oils, and these additives are expensive in comparison to the cost of the oils. Thus, even with the use of these chemical additives, it becomes necessary to empty the storage reservoir due to the toxicity of the cutting oil and the growth of bacteria therein. Due to the bacterial growth in and toxicity of these cutting oils, they cannot be readily disposed of. way of Objects of this invention are to provide a recirculating apparatus for ozone treatment of contaminated solutions which eliminates offensive odors, reduces health hazards and adverse ecological and environmental effects, prolongs the useful life of industrial cutting and cooling oils, provides a comparatively economical way of treating industrial cutting and cooling oils, and is of economical manufacture and assembly and relatively maintenance and service-free.

These and other objects, features and advantages are disclosed in the following description and accompanying drawing in which:

FIG. 1 is a semi-schematic showing of a recirculating apparatus for treating contaminated liquids with ozone constructed in accordance with this invention; and FIG. 2 is a sectional view of a venturi of the apparatus of FIG. 1.

FIG. 1 illustrates a recirculating apparatus 10 for the ozone treatment of contaminated liquids with a holding chamber or tank 12, and a treatment chamber or tank 14 with a plurality of venturies 16 and 18. Venturies 16 and 18 inject air from an air compressor 20 containing ozone produced by a generator 22 along with contaminated liquid into treatment tank 14. Venturies 16 AND 18 thoroughly mix the contaminated liquid with the ozonized air so that the ozone will reduce the contaminants in the liquid. Air compressor 20 is connected to ozone generator 22 through an accumulator tank 24, an air dryer 26, a flow meter 28, an adjustable pressure regulator or control valve 30, a pressure relief valve 32, a check valve 34 and appropriate conduits or pipes 36 to provide a supply of air under pressure to ozone generator 22. Pressure relief valve 32 prevents the pressure in line 36 from becoming great enough to damage generator 22 and check valve 34 prevents any ozonized air and provides a secondary valve preventing contaminated liquid from backing-up into the pressure relief and control valves if apparatus 10 should malfunction. Generator cell 22 passes the compressed air through a corona produced by the silent discharge of an electric current to convert the oxygen in the compressed air to ozone which is discharged through conduits 38 and check valve 40 into venturies 16 and 18. Check valve 40 prevents the liquid in tank 14 from backing-up into generator 22 if apparatus 10 should malfunction and pressure regulator 30 controls the pressure at which ozonized air is supplied to venturies 16 and 18. Ozone generator cells are shown and described in Schaefer U.S. Pat. No. 2,403,241 and Schaefer application, Ser. No. 801,674 filed Feb. 24, 1969, now abandoned, which are incorporated herein by reference and hence, need not be described in further detail.

Untreated contaminated liquid from a reservoir (not shown) is injected into treatment tank 14 by a centrifugal pump 42 connected to venturi 18 and driven by a motor 44. The inlet of centrifugal pump 42 is connected to the reservoir through an inlet line 46, filter 48, check valve 50, tee fitting 52, and a nipple 54. The outlet of pump 42 is connected to venturi 18 through a one-way check valve 56, adjustable-rate-of-flow control valve 58, flow meter 60, pressure indicator gauge 62, and appropriate conduits 64 and elbow 66. Liquid from either the reservoir or holding tank 12 is injected into treatment tank 14 by another centrifugal pump 68 connected to venturi 16 and driven by a motor 70. The inlet of pump 68 is connected to tee 52 and hence, the reservoir through a check valve 72, shut-off valve 74, junction block 76, check valve 77 and suitable conduits 78. The outlet of pump 68 is connected to venturi 16 through a tee fitting 80, adjustable-rate-of-flow control valve 82, flow meter 84, pressure indicator gauge 86, and appropriate conduits 88. The prime of pumps 42 and 68 is retained when they are shut-off by check valves 50 and 77. Pump 42 is prevented from drawing any fluid through line 78 by check valve 72.

It is preferable to use a plurality of small!-capacity venturies connected to each pump to inject ozonized air and liquid into treatment tank 14. Several small-capacity venturies do a better job of mixing the ozonized air with the liquid than does a single large venturi having a capacity equal to the sum of the capacities of the small venturies. Venturies 16 and 18 are of identical construction and as illustrated in FIG. 2 have a body 98 with an ozonized air inlet 100 connected to an axial bore 102 with a liquid inlet 104. A metering orifice 106 and a mixing tube 108 are axially received in bore 102. Mixing tube 108 has tapered inlets and outlets 110 and 112 connected by a constricted middle section 114 and orifice 106 has a metering opening 116 therethrough and a slot 118 in one end to facilitate installation and removal of the orifice from bore 102. Venturies 16 and 18 function most effectively only through a narrower range of flow rates than the range of flow rates provided by pumps 42 and 68. Therefore, orifice 106 and tube 108 are threadily received in body 98 so that the orifice and tube can be readily exchanged for a different size orifice and tube to adapt venturies 16 and 18 for use in a different range of flow rates.

Holding and treatment tanks 12 and 14 are preferably formed of stainless steel or lines with inert plastic to prevent ozone from attacking and oxidizing the tanks and are connected about two-thirds of the way up from their bottom and below the normal liquid level 120 by a crossover pipe 122. To prevent ozonized air from passing into holding tank 12 crossover pipe 122 has a tongue 124 on its lower portion which extends into treatment tank 14 to provide a shield or baffle tending to deflect the ozonized air around pipe 122. During normal operation of apparatus 10 the ozonized air bubbles through the liquid and the air and any unspent ozone escapes to the atmosphere through a vent pipe 126 connected to the top of both of the tanks through transparent sleeves 128. Treatment of some contaminated liquids produces a foam in the top of tanks 12 and 14 which can be controlled by sprinkling liquid on the foam with sprinkler heads 130 in the top of the tanks. Sprinkler heads 130 are connected to tee 80 and thus, the outlet of pump 68 through a shut-off valve 132, tee 134 and suitable conduits 136. Treated liquid flows from holding tank 12 through an outlet pipe 138 connected through a vent pipe 140 to an outlet 142 about one-fourth of the way up from the bottom of tank 12. The liquid level 120 during normal operation of apparatus 10 is determined by the vertical position or point at which liquid outlet pipe 138 is connected to vent pipe 140 above the connection 122 between tanks 12 and 14. The bottom of treatment tank 14 is connected to a drain (not shown) through a shut-off valve 146 and conduits 148 and the bottom of holding tank 12 is connected to the drain through junction block 76, shut-off valves 150 and 152, and suitable conduits 154.

In operating recirculating apparatus 10 to treat contaminated liquids with ozone, holding and treatment tanks 12 and 14 are initially filled with untreated contaminated liquid to normal operating level 120 by closing valves 146 and 152, opening valve 150, and running pump 42 to inject liquid into tank 14 through check valve 56, rate-of-flow control valve 58, flow meter 60, pressure gauge 62, and venturi 18. When the level of the liquid in treatment tank 14 rises to crossover pipe 122, the untreated liquid flows into holding tank 12 and the liquid level in both tanks rises until the liquid begins to flow through outlet pipe 138 at which point pump 42 is shut off. Liquid can be treated with ozone and simultaneously recirculated through tank 14 and discharged through outlet pipe 138 by opening valve 150, closing valves 74, 146 and 152, and running both pumps 42 and 68, air compressor 20, air dryer 26, and ozone generator 22. Compressor 20 receives atmospheric air and supplies compressed air to generator 22 which converts the oxygen in the compressed air to ozone which is delivered under pressure to venturies 16 and 18. Venturies 16 and 28 thoroughly mix the ozonized air with the liquid supplied to the venturies by pumps 42 and 68 and discharge the mixture into treatment tank 14. The ozonized air rises or bubbles through the liquid in tank 14 where most of the ozone is used or spent in oxidizing and reducing contaminants in the liquid. Most of the spent ozonized air passes through the liquid in tank 14 and escapes through vent 126 to the atmosphere. The liquid in tank 14 passes through crossover pipe 122 into holding tank 12 where the rest of the spent ozonized air passes to the atmosphere through vent 126 and a portion of the treated liquid flows from holding tank 12 through outlet 142 into outlet pipe 138. The other portion of the liquid passes through the bottom of tank 12 and is recirculated by pump 68 through venturi 16 where it is again mixed with ozone and discharged into treatment tank 14. Holding tank 12 assures that all of the air and ozone escape from the treated liquid to the atmosphere through vent 126 before the liquid flows through pump 68 or into outlet pipe 138. Allowing the air to escape from the liquid before it is recirculated prevents cavitation of the pump, rapid deterioration of the pump and equipment connected to outlet pipe 138 by oxidation due to ozone trapped in the liquid, and assures maximum exposure of the liquid being treated in apparatus 10 to the ozonized air.

In practice, it has been found that supplying the ozonized compressed air to venturies 16 and 18 at a pressure of 5 psig in line 38 approximately doubles the amount of ozone mixed with the contaminated liquid compared to allowing the venturies to create a partial vacuum in line 38 when pumps 42 and 68 are supplying liquid to venturies 16 and 18 at a pressure of 45 to 50 psig. The pressure of the ozonated air in line 38 is controlled by adjustable pressure regulator valve 30. The rate at which apparatus 10 discharges treated liquid through outlet pipe 138 depends on the rate at which pump 42 discharges untreated liquid into tank 14 through venturi 18 which is controlled within the limits of the operating range of the venturi by adjustable-rate-of-flow valve 58. The extent to which the liquid being treated is exposed to ozonized air is determined by the rate of flow of liquid through venturi 16 in relation to the rate of flow of liquid through venturi 18. For example, if untreated liquid flows through venturi 18 at the rate of 10 gallons per minute and liquid being treated is recirculated and flows through venturi 16 at 30 gallons per minute, the liquid will be subjected to three cycles in venturi 16 plus one cycle in venturi 18 of mixing with ozonized air and be discharged from the system through outlet pipe 138 at the rate of 10 gallons per minute. The rates of flow of liquid through venturies 16 and 18 can be varied over a wide range of values to provide the proper duration or extent of exposure to and mixing of ozonized air that is required to oxidize or reduce the contaminants in the particular liquid being treated. The rates of flow through to venturies 16 and 18 are varied and controlled within the limits of the operating range of the venturies by adjusting rate-of-flow valves 82 and 58, respectively, which are connected to the outlets of pump 68 and 42, respectively. The operating range of venturies 16 and 18 is varied by changing orifice 106 and tube 108.

If desired, the maximum rate of continuous flow of the treated liquid through outlet 138 without any recirculation of the liquid through tanks 12 and 14 can be achieved by closing valves 146, 150 and 152, opening valve 74, and running both pumps 42 and 68 with their rate-of-flow valves 58 and 82 adjusted to achieve a maximum rate of flow. When apparatus 10 is operated to achieve the maximum rate of flow, the contaminated liquid is subjected to only one cycle or mixing of ozone with the liquid by ventures 16 and 18 before the liquid flows out of the apparatus through outlet pipe 138. Thus, when apparatus 10 is operated to achieve the maximum rate of flow, the liquid being treated is not recirculated for multiple exposure to and mixing with ozonated air from ozone generator 22. Some contaminated liquids when treated in apparatus 10 produce a foam or froth which floats on top of the liquid in tanks 12 and 14. An excess build-up of this foam or froth in tanks 12 and 14 can be prevented by sprinkling liquid on the foam with sprinkler heads 130 which are controlled by valve 132. To drain apparatus 10, pumps 42 and 68 are shut off and valve 146 is opened to drain treatment tank 14 and holding tank 12 is drained by closing valve 74 and opening valves 150 and 152.

This apparatus provides a closed system for treating contaminated liquids by oxidation and reduction of the contaminants in which the duration or extent of exposure and mixing of the liquid being treated with ozone can be readily varied and controlled to provide the exposure needed for proper treatment of a variety of contaminated liquids. This apparatus reduces the health hazard and adverse ecological and environmental effects of contaminated liquids, increases the useful life of industrial cutting and cooling oils, and provides a highly versatile apparatus of comparatively economical manufacture which requires little maintenance and service in normal operation.

I claim:

1. An apparatus for the recirculating treatment of contaminated liquids with ozone comprising:
   a. a holding chamber with an outlet for treated liquid, treated
   b. a treatment chamber with a crossover conduit connecting said chambers to allow liquid in said treatment chamber to flow into said holding chamber,
   c. at least one first venturi to mix ozone with a contaminated liquid and discharge the mixture into said treatment chamber below said crossover conduit,
   d. at least one second venturi to mix ozone with liquid from said holding chamber and discharge the mixture into said treatment chamber below said crossover conduit, and
   e. ozone generator means adapted to supply ozone to said first and second venturies, whereby said first venturi mixes ozone supplied by said generator means with contaminated liquid and discharges the mixture into said treatment chamber, the liquid in said treatment chamber flows through said crossover conduit into said holding tank, and ozone supplied by said generator means is mixed by said second venturi with liquid from said holding chamber and discharged into said treatment chamber with treated liquid flowing from said holding chamber through said outlet for treated liquid.

2. The ozone treatment apparatus of claim 1 which also comprises a first pump operably connected to said first venturi and adapted to supply contaminated liquid under pressure to said first venturi and a second pump operably connected to said treatment tank and to said second venturi to supply liquid under pressure to said second venturi from said treatment tank.

3. The ozone treatment apparatus of claim 2 which also comprises first and second adjustable-rate-of-flow control valves and in which said first and second pumps comprise first and second centrifugal pumps with the outlet of said first pump connected to said first venturi through one of said flow control valves and the outlet of said second pump connected to said second venturi through the other of said control valves, such that the rate of flow of liquid through said first and second venturies can be adjusted by said control valves to vary and control the extent to which the liquid being treated is mixed with ozone in said venturies before the liquid being treated is discharged from the apparatus through said outlet for treated liquid of said holding chamber.

4. The treatment apparatus of claim 1 which also comprises compressor means operably connected to said ozone generator to supply ozone to said venturies at a pressure greater than atmospheric pressure, whereby the amount of ozone mixed with the liquid by said venturies is increased.

5. The treatment apparatus of claim 3 which also comprises compressor means operably connected to said ozone generator to supply ozone to said venturies at a pressure greater than atmospheric pressure, whereby the amount of ozone mixed with the liquid by said venturies is increased.

6. The apparatus of claim 1 which comprises a plurality of said first and said second venturies.

7. The apparatus of claim 3 which comprises a plurality of said first and said second venturies.

8. The apparatus of claim 4 which comprises a plurality of said first and said second venturies.

9. The apparatus of claim 5 which comprises a plurality of said first and said second venturies.

10. The treatment apparatus of claim 1 in which each of said first and said second venturies has a body with a removable liquid metering orifice and a tube received therein such that said metering orifice and said tube can be readily removed and exchanged, whereby said venturies can be readily adapted for different rates of flow of liquid through said venturies.

11. The treatment apparatus of claim 3 in which each of said first and said second venturies has a body with a removable liquid metering orifice and tube received therein such that said metering orifice and said tube can be readily removed and exchanged, whereby said venturies can be readily adapted for different rates of flow of liquid through said venturies.

12. The treatment apparatus of claim 9 in which each of said first and said second venturies has a body with a removable liquid metering orifice and a tube received therein such that said metering orifice and said tube can be readily removed and exchanged, whereby said venturies can be readily adapted for different rates of flow of liquid through said venturies.

13. The treatment apparatus of claim 2 in which the inlet of said second pump is connected through a first valve to said holding tank and through a second valve is adapted to be connected to a reservoir of untreated liquid, whereby said valves can be manipulated such that said second pump can supply liquid under pressure to said second venturi from either said holding tank or the reservoir of untreated liquid.

14. The treatment apparatus of claim 12 in which the inlet of said second pump is connected through a first valve to said holding tank and through a second valve is adapted to be connected to a reservoir of untreated liquid, whereby said valves can be manipulated such that said second pump can supply liquid under pressure to said second venturi from either said holding tank or the reservoir of untreated liquid.

* * * * *

PO-1050
(5/69)

UNITED STATES PATENT OFFICE
CERTIFICATE OF CORRECTION

Patent No. 3,685,656   Dated August 22, 1972

Inventor(s) RICHARD J. SCHAEFER

It is certified that error appears in the above-identified patent and that said Letters Patent are hereby corrected as shown below:

IN THE SPECIFICATION:

Column 1, in line 38, delete "way of"; and in line 63 delete "AND" and insert --and--.

Column 2, in line 22, after "Schaefer" and before "application" insert --application Ser. No. 198,937, filed November 15, 1971 as a continuation of copending Schaefer--; and in line 49, delete "small!-capacity" and insert --small-capacity--.

Column 3, in line 9, delete "lines" and insert --lined--; and in line 63, delete "28" and insert --18--.

Column 5, in line 2, delete "rate-of4flow" and insert --rate-of-flow--; and in line 39, delete "treated".

Column 6, in line 3, delete "treatment tank" and insert --holding chamber--; in line 5, delete "treatment tank" and insert --holding chamber--; in line 49, after "and" and before "tube" insert --a--; and in line 63, delete "tank" and insert --chamber--.

Column 7, in line 2, delete "tank" and insert --chamber--; and in line 6, delete "tank" and insert --chamber--.

Column 8, in line 4, delete "tank" and insert --chamber--.

IN THE DRAWING:

The unnumbered valve between tee 80 and tee 134 which is connected with said tees by conduits 136 is designated by a lead line and the reference number 132.

Signed and sealed this 22nd day of May 1973.

(SEAL)
Attest:

EDWARD M. FLETCHER, JR.
Attesting Officer

ROBERT GOTTSCHALK
Commissioner of Patents